United States Patent Office

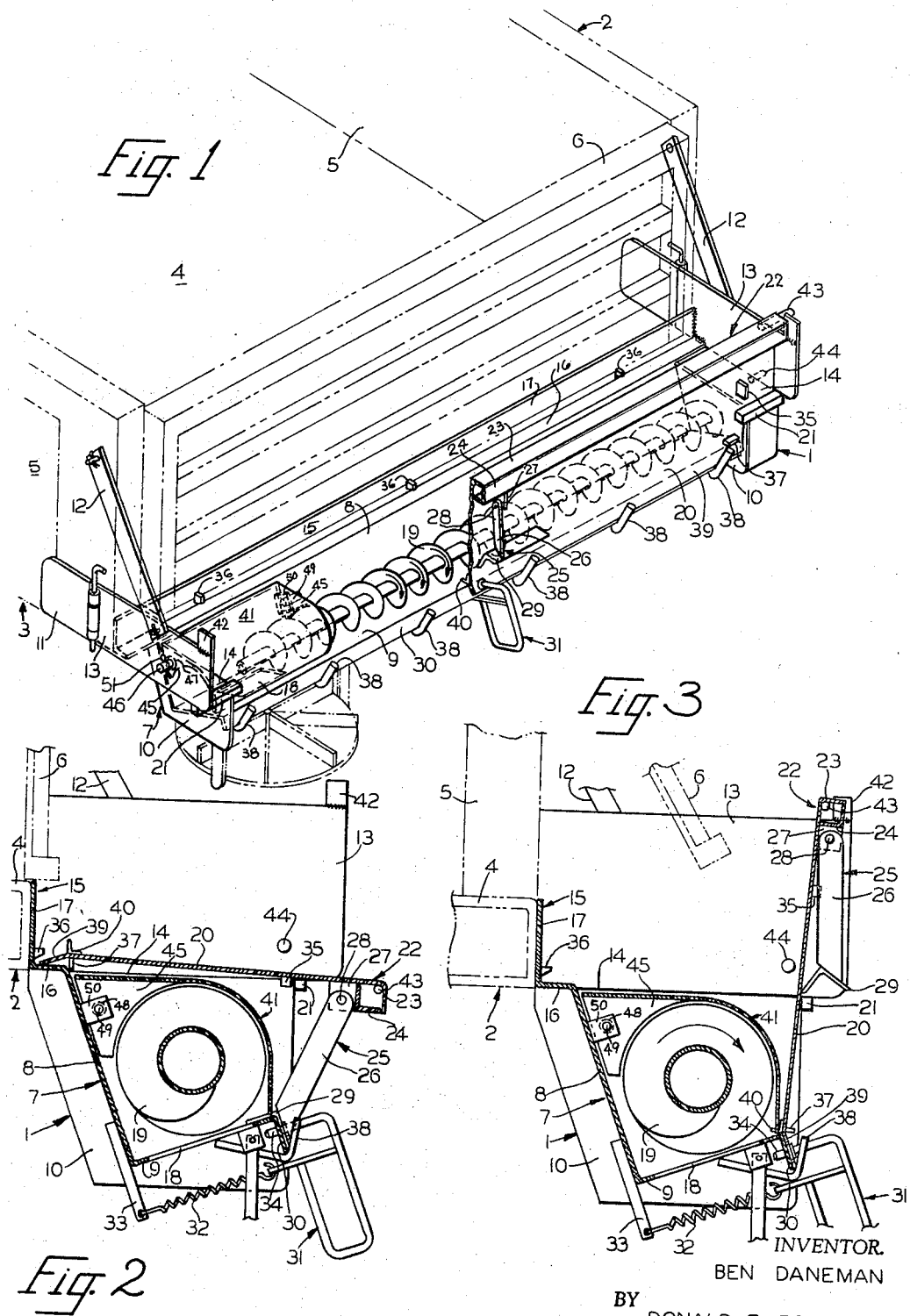

3,349,970
Patented Oct. 31, 1967

3,349,970
HOPPER FOR SPREADER APPARATUS
Ben Daneman, Milwaukee, Wis., assignor to Central Engineering Company, Inc., Milwaukee, Wis., a corporation of Wisconsin
Filed Dec. 22, 1965, Ser. No. 515,544
9 Claims. (Cl. 222—166)

ABSTRACT OF THE DISCLOSURE

A hopper for material spreader apparatus for dump box vehicles, including a self-cleaning hopper body which has no fixed outer wall; a cover plate which is movable from a protective covering position over the top of the hopper body for the discharge of nonspreader material thereover from the dump box, through intermediate positions in which it provides a cleanout opening for the hopper body, to a backing position to provide an outer wall for the hopper body for receipt from the dump box and spreading of spreader materials; and a curved feed plate which partially surrounds material moving means in the hopper body above the discharge opening in the bottom wall thereof and which is removable to permit the removal of residual and jamming materials thereunder.

---

This invention relates to an improved hopper for vehicle-mounted spreader apparatus for spreading material on roads and the like.

The use of vehicle-mounted spreader apparatus to spread material (such as salt or sand) on roads and streets is known in the art. Ordinarily, the hopper for such spreader apparatus is comprised of a hopper body, having a generally U-shaped cross-section, which is mounted below the tailgate of the dump box of the vehicle to receive material from the dump box, and which contains one or more rotatable worm augers to move the material to a discharge opening in the bottom of the hopper body; and a virtually flat feed plate mounted on the hopper body above the discharge opening and the auger to compress the material and positively feed it to the discharge opening and to a spreader mechanism (such as a rotary broadcast-type spreader) mounted below the discharge opening, which receives and spreads the material.

The present invention provides an improved hopper including a hopper body which has an inner or front wall, end walls or plates and a bottom wall having a discharge opening, but does not have a fixed outer or rear wall. A cover plate is provided which is movable from a covering position extending across the top of the hopper body to a backing position providing an outer or rear wall extending upwardly from the bottom of the hopper body and in substantially material-tight communication therewith. The cover plate is adjustable to cleanout positions intermediate the covering position and the backing position whereby, in the covering position and the cleanout positions, a cleanout opening extending the length of the hopper body is provided above the outer edge of the bottom wall of the hopper body. A curved feed plate may be removably mounted on the hopper body above the discharge opening and extends (in the same direction as the direction of the rotation of the auger) from the inner or front wall of the hopper body around the auger to the bottom of the hopper body adjacent the discharge opening.

The vehicle may be used for hauling and dumping material (such as rocks) from the box over the top of the hopper body without removing the hopper from the vehicle, because the cover plate, in its covering position, provides a surface over which the materials may be dumped and protects the hopper body and the auger from damage therefrom. When the cover plate is moved to its backing position, a hopper is provided which may be used to spread material in the conventional manner. If, during spreading, the auger jams because a large, unbreakable piece of material lodges between the auger and the cover plate or the bottom of the hopper body, the driver may quickly and easily raise the cover plate from its backing position to an intermediate cleanout position to provide the cleanout opening and remove the jamming piece of material and then may return the cover plate to its backing position for further material spreading. When the desired spreading has been accomplished, the cover plate may be returned to its covering position. A self-cleaning hopper body thereby is provided, from which any remaining material may be quickly and effortlessly removed without the hydraulic flushing required in previous U-shaped hopper bodies wherein the outer or rear wall is fixed, by tilting the hopper body so that the remaining material will flow through the cleanout opening and over the outside or rear edge of the bottom of the hopper body. The curved feed plate surrounds the auger through approximately 180 degrees of the rotation thereof and more completely compresses and more positively and consistently feeds material to the discharge opening, and more completely prevents the flow of material to such discharge opening when the auger is not rotating, than has been possible with previous hopper constructions employing flat feed plates. Because the cover plate is readily removable from its backing position, the curved feed plate may be quickly and easily removed from the hopper body to gain access to that portion of the hopper body below the feed plate to remove jamming pieces of material therefrom or to remove the auger from the hopper body.

The best mode presently contemplated of carrying out the invention is illustrated in the accompanying drawings, in which FIGURE 1 is a fragmentary perspective view of a hopper embodying the present invention, with parts of the hopper broken away to illustrate details of construction.

FIGURE 2 is a fragmentary sectional view through the hopper shown in FIGURE 1, illustrating the feed plate mounted on the hopper and the cover plate in its covering position.

FIGURE 3 is a fragmentary sectional view of the hopper shown in FIGURE 1, illustrating the feed plate mounted on the hopper and the cover plate in its backing position.

The hopper 1 is mounted on the dump box 2 of a self-propelled truck or like vehicle 3. The dump box 2 shown is mounted on the truck 3 for tilting movement relative thereto about a horizontal axis extending crosswise of the truck 3. However, it is contemplated that the present invention also is adapted for use with trucks having different dump box arrangements and that, for example, the dump box may be mounted on the truck for tilting movement about an axis parallel to the front-to-rear centerline of the truck and at one side of the truck (in which case the hopper would be mounted on the side of the dump box adjacent such axis). The dump box 2 may be of any conventional construction and, as shown, includes a floor or bottom 4, side walls 5 and a tailgate 6, which is pivotally mounted on the side walls 5 of the dump box 2 so that the tailgate 6 either may be opened by being swung downwardly about an axis adjacent the bottom thereof or upwardly about an axis adjacent the top thereof.

*Hopper body*

An elongated hopper body 7, which has a generally L-shaped cross section and includes an inner or front wall 8, a bottom wall 9 and end walls or plates 10, is mounted across the rear side or end of the dump box 2 and below the floor 4 of the dump box 2 for movement with dump box 2, with the upper edge of the inner wall 8 disposed at a level below the floor 4 of the dump box 2 to allow the tailgate 6 of the dump box 2 to be swung downwardly at least to a position substantially coplanar with the floor 4 of the dump box 2. It is contemplated that the hopper body 7 may be mounted across the rear side or end of the dump box 2 by any of several means, which may include means (such as welding) whereby the hopper body 7 would be permanently mounted thereon and means whereby the hopper body 7 may be tilted independent of any tilting of the dump box 2. However, it is preferred that the hopper body 7 be rigidly attached to the dump box 2 for tilting movement therewith so that residual material in the hopper body 7 may be removed therefrom by tilting the dump box 2, and that the hopper body 7 be removable from the dump box 2 for the purposes of performing repairs on the hopper body 7 and to permit the attachment of other auxiliary equipment to the rear side or end of the dump box 2. Therefore, as shown in the accompanying drawings, the hopper body 7 is removably mounted on the side walls 5 of the dump box 2 by mounting plate and pin assemblies 11 and by brace brackets 12 which are secured, as by bolting, to the respective side walls 5 of the dump box 2 and to material guide plates 13, which are welded to and extend upwardly from end plate flanges 14 at opposite ends of the hopper body 7.

Leakage of material between the inner wall 8 of the hopper body 7 and the floor 4 of the dump box 2 is prevented by an L-shaped inner wall flange 15 on the upper edge of the inner wall 8, with the horizontal portion 16 of the inner wall flange 15 disposed substantially coplanar with the end plate flanges 14 and at opposite ends thereof extending over the end plate flanges 14, and with the vertical portion 17 thereof abutting the rear side or end of the dump box 2 below the floor 4 thereof. In order to provide rigidity and strength to the hopper body, and to prevent leakage of material between the inner wall flange 15 and the material guide plates 13 (which guide the flow of material from the dump box 2 into the hopper body 7 when the tailgate 6 is swung upwardly), the opposite ends of the inner wall flange 15 are dimensioned to extend between the material guide plates 13 and are welded thereto.

The hopper body 7 has a discharge opening 18 in the bottom 9 thereof spaced inwardly from the end plates 10; and a single auger 19, having spiral flights, is rotatably supported in bearings mounted on the end plates 10, and driven by any suitable power source (such as a hydraulic motor), not shown, mounted adjacent one of the hopper end plates 10, for feeding material lengthwise of the hopper body 7 to the discharge opening 18. As shown, the auger 19 is driven to rotate in a right-hand direction, to follow the flow of material from the dump box 2 into the hopper body 7 and so that the material will be carried by the flights of auger 19 over the top of the auger 19, all so that the material flow will assist, rather than resist, the rotation of the auger 19. Although it is contemplated that the invention encompass hoppers containing other material moving means (such as a conveyor belt or dual augers), it is preferred to use a single auger 19 of the type shown because of the simplicity and lower cost of its construction, installation and removal.

*Cover plate*

A cover plate 20 is provided for the hopper body 7 which, in its covering position, extends over and protects the auger 19 from damage when material is dumped from the dump box 2 over the hopper body 7, and is supported in such covering position by the inner wall flange 15 and the end plate flanges 14. Additional support for the cover plate 20 in its covering position, and a horizontal axis about which the cover plate 20 may be pivoted when being raised from its covering position to its backing position, is provided by two horizontal end plate lugs 21, which respectively are welded to the outer or rear edges of the end plate flanges 14 and the end plates 10, with the tops of the lugs 21 substantially coplanar with the end plate flanges 14. In order to provide stiffness to the length of the cover plate 20, the outer edge 22 of the cover plate 20 has a box-shaped cross-section, comprised of a flange 23 at approximately a right angle to the cover plate 20 and an L-shaped longitudinal brace 24 welded to the edge of such flange 23 and to the underside of the cover plate 20. A support arm 25 attached to the underside of the cover plate 20 provides support for the center portion of cover plate 20, when in its covering position. Although the support arm 25 may be fixedly attached to the cover plate 20, it is preferred that it be swingably attached thereto so that, when the cover plate 20 is pivoted upwardly by the driver to its backing position, the support arm 25 will swing downwardly and hang adjacent the underside of the cover plate 20. Although it is contemplated that the invention encompass other constructions of the support arm (such as a single arm or a plate attached to the underside of the cover plate 20), in the embodiment illustrated the support arm 25 is comprised of two arms 26, each of which are pivotally or swingably connected at one end to arms 27 welded to the underside of the cover plate, by means of pins 28, in order to permit the relatively unobstructed flow of residual material out of the hopper body 7 and past the support arm 25, when the hopper body 7 is tilted. The arms 26 are held in spacial relationship to each other by an L-shaped cross-bar 29, which is welded to the ends of the arms 26 opposite the arms 27. As illustrated in FIGURE 2, when the cover plate 20 is in its covering position, the L-shaped cross-bar 29 of support arm 25 engages and rests on the bottom 9 of the hopper body 7 and on a flange 30 on the outer edge of the bottom 9, which extends downwardly at an angle of approximately ninety degrees to the plane of the bottom 9. The cross-bar 29 is releasably connected to the bottom flange 30 by pin and spring assembly 31, in which the spring 32 is connected to arm 33 welded to the underside of the wall 8 of the hopper body 7 and extending below the bottom 9 thereof, and the pin 34 thereof is inserted through corresponding holes in the cross-bar 29 and the bottom flange 30 to hold the cross-bar 29 against the bottom flange 30. When the pin 34 is withdrawn from the cross-bar 29 and the bottom flange 30 and the cover plate 20 is raised, drawn away from the dump box 2, and pivoted upwardly about the horizontal axis of the end plate lugs 21 to its backing position, the support arm 25 swings downwardly about the pins 28 to a position adjacent the underside of the cover plate 20, as shown in FIGURES 1 and 3.

Rearward movement of the cover plate 20 in its covering position (as might occur when the truck 3 is accelerated or the dump box 2 is tilted) is prevented by the insertion of the pin 34 through the cross-bar 29 and the bottom flange 30, and by two downwardly projecting lugs 35 welded to the underside of cover plate 20, which (when the cover plate 20 is in its covering position) abut against the inner or front vertical surfaces of the end plate lugs 21. In addition, outwardly or rearwardly extending spaced retention lugs 36 are welded to the vertical portion 17 of the inner wall flange 15 at a height above the horizontal portion 16 thereof which will permit the inner or front edge of the cover plate 20 to be slidably inserted between the retention lugs 36 and the horizontal portion 16 of the inner wall flange 15, to prevent the inner edge of the cover plate 20 from rising when the dump box 2 is tilted.

In order to prevent the truck driver from inadvertently drawing the cover plate away from the dump box 2 beyond the end plate lugs 21, and to provide a pivoting surface for the end plate lugs 21, two downwardly extending pivot lugs 37 are welded to the underside of the cover plate 20 adjacent its inner edge. When cover plate 20 is drawn away from dump box 2 until the pivot lugs 37 encounter the end plate lugs 21, the cover plate 20 may be pivoted upwardly and lowered into backing position, in which its inner or front edge rests in substantially V-shaped lugs 38, which are welded to the underside of the bottom 9 and to the edge of the bottom flange 30 of the hopper body 7 with the V thereof adjacent the edge of the bottom flange 30.

In order to prevent leakage of material between the inner edge of the cover plate 20, when in its backing position, and the bottom flange 30, the inner edge of the cover plate 20 has a downwardly angled flange 39; and an upwardly projecting metal seal strip 40 is welded to the upper side of the cover plate 20 adjacent the flange 39 and extending along that portion of the length of the cover plate 20 which, when the cover plate 20 is in its backing position, is not immediately adjacent the curved feed plate 41. When in the course of moving the cover plate 20 to its vertical position the edge of the flange 39 is lowered into the V-shaped lugs 38, the V shape of the lugs 38 causes the edge of the flange 39 to slide along the lugs 38 toward the bottom flange 30 until the flange 39 abuts against the bottom flange 30, and the seal strip 40 overlies the bottom 9, forming in combination a substantially material-tight seal between the bottom 9 and the cover plate 20.

It is contemplated that the invention encompass other constructions of the hopper body bottom 9 providing means for supporting the inner edge of the cover plate 20 in its backing position (such as a construction whereby bottom flange 30 has a V-shaped cross-section). However, it is preferred to employ longitudinally spaced lugs 38, in order that residual material may freely flow from the hopper body 7 and over the outside edge of the bottom 9 thereof when the cover plate 20 is in its covering position and the hopper body 7 is tilted.

Movement of the cover plate 20, when in its backing position, away from dump box 2 is prevented by the end plate lugs 21, against which the underside of the cover plate 20 rests. A slight degree of outward or rearward bending of that portion of cover plate 20 which extends above the end plate lugs 21 has been found to be desirable in the event that the tailgate 6 should swing upwardly and strike such portion or a large piece of material should strike such portion. To provide a limit for such bending, and to prevent distortion of the cover plate 20 as might occur if the cover plate 20 were permitted to bend an excessive amount, the upper edge of each of the material guide plates 13 is shaped (as by cutting or, as shown, by the addition thereto as by welding) to include an upstanding ear 42. Rods 43 are welded inside and project from either end of the box-shaped outer or rear edge 22 of the cover plate 20, and will encounter the ears 42, respectively, when such portion of cover plate 20 is substantially bent outwardly.

Movement of the cover plate 20, when in its vertical position, toward the auger 19, as might occur when material ceases to flow from the dump box 2 to the hopper body 7, is limited by inwardly projecting dowels 44 which are welded to the material guide plates 13 and which the cover plate 20 will strike in the event of such movement thereof. Upward vertical movement of the cover plate 20 is prevented by the pin 34 of the pin and spring assembly 31, which is inserted through corresponding holes in the cover plate flange 39 and the bottom flange 30.

*Feed plate*

A curved feed plate 41 is detachably mounted on the hopper body 7 to compress the material moved by the auger 19 to the discharge opening 18 when the auger 19 is rotated, and to prevent the flow of material through the discharge opening 18 when the auger 19 is not rotated. The feed plate 41 is dimensioned to extend from the end plate 10 adjacent the discharge opening 18 completely over the discharge opening 18, and from the inner wall 8 of the hopper body 7 around the spiral flights of the auger 19 to the bottom 9 of the hopper body 7 adjacent the outer or rear edge of the discharge opening 18. In order to achieve maximum compression of material, the raduis of curvature of the curved portion of the feed plate 41 should be slightly larger than the radius of curvature of the flights of the auger 19. Support and rigidity for the feed plate 41 when it is mounted on the hopper body 7, is provided by downwardly extending legs 45, which are welded to the opposite edges of the flat, inner or front portion of the feed plate 41. The outside or forward edges of the legs 45 rest against the inner wall 8 of the hopper body 7, and the inside or rear edges thereof are in the shape of a curve having a radius of curvature slightly larger than the radius of curvature of the flights of the auger 19, so that when the auger 19 is not rotated, the flow of material to the discharge opening 18 is prevented by the flights of the auger 19. Means for detachably mounting the feed plate 41 on the hopper body 7 are provided and comprise an outwardly extending pin 46, which is welded to the leg 45 adjacent the end plate 10 and which may be inserted through an opening 47 in the end plate 10; and an opening 48 in the other leg 45, through which a pin 49 welded to a cleat 50 on the inner wall 8 of the hopper body 7 may be inserted. When the feed plate 41 is placed over and surrounding the auger 19, with the legs 45 resting against the inner wall 8 of the hopper body 7 and with the outside or rear edge of the feed plate 41 resting on the bottom 9 adjacent the outer or rear edge of the discharge opening 18, and with the pin 49 under the feed plate 41, the feed plate 41 may be pushed outwardly until the leg 45 abuts the end plate 10, with the pin 46 inserted through the opening 47 and the pin 49 inserted through the opening 48, and the feed plate 41 thereby mounted on the hopper body 7 in operating position. A cotter pin 51 may be inserted through the pin 46 to prevent the inward movement of the feed plate 41.

*Operation of hopper*

The following is a brief summary of the use and operation of the hopper 1.

When it is intended to dump material from the dump box 2 over the top of the hopper 1, the cover plate 20 is placed on the hopper body 7 in its covering position, with the flange 39 overlying the horizontal portion 16 of the inner wall flange 15 and the edge of the flange 39 inserted under the retention lugs 36, and with the underside of the cover plate 20 resting on the end plate flanges 14 and the end plate lugs 21, with the lugs 35 abutting the end plate lugs 21, and with the L-shaped cross-bar 29 of the support arm 25 resting on the bottom 9 of the hopper body 7 and attached to the bottom flange 30 by the pin 34. The driver then may open the tailgate 6 by either swinging the tailgate 6 upwardly about its upper edge or by swinging the tailgate 6 downwardly about its lower edge so that the tailgate lays over the cover plate 20. In either such tailgate position, material may flow from the dump box 2 over the cover plate 20 without flowing into the hopper body 7.

If the driver desires to operate the hopper 1 for spreading material contained in the dump box 2, he withdraws the pin 34 from the holes in the cross-bar 29 and the bottom flange 30, grasps the box-shaped outer rear edge 22 of the cover plate 20, lifts the cover plate 20 until the lugs 35 are above the end plate lugs 21 and pulls the cover plate 20 away from the dump box 2 until the pivot lugs 37 encounter the end plate lugs 21. Then, using the end plate lugs 21 as pivot points, he raises the outer edge 22 of the cover plate 20, allows the edge of the flange 39 of the cover plate 20 to drop downwardly into the V-shaped lugs 38 with the flange 39 abutting the bottom flange 30 and the seal strip 40 overlying the bottom 9 of the hopper body 7, and inserts the pin 34 through the corresponding holes in the flange 39 and the bottom flange 30. The cover plate 20 then is in its backing position, in which the inside edge of the cover plate 20 rests in the V-shaped lugs 38 and the underside thereof rests against the end plate lugs 21, and the support arm 25 hangs vertically adjacent the underside of the cover plate 20. The tailgate 6 then may be swung upwardly about its upper edge permitting the material to flow from the dump box 2 into the hopper body 7, where the material is moved by the rotating auger 19 to the discharge opening 18 in the bottom 9 of the hopper body 7 and is compressed by the curved portion of curved feed plate 41 and positively fed to the discharge opening 18. In the event that, during the spreading operation, a relatively large unbroken piece of material becomes lodged between the flights of the auger 19 and the bottom 9 of the hopper body 7 or the cover plate 20, jamming the auger 19, the driver may grasp the outer edge 22 of the cover plate 20 and raise the cover plate 20 from its backing position to an intermediate cleanout position, reach into the hopper body 7 through the cleanout opening thereby provided and remove the jamming piece of material. If necessary, the driver may raise the cover plate 20 until the pivot lugs 37 encounter the end plate lugs 21 and, again using the end plate lugs 21 as pivot points, pivot the cover plate 20 away from the dump box 2 to a horizontal position and slide it toward the dump box 2 and into its covering position. The driver then may examine all portions of the hopper body 7 and the auger 19 (other than the portions thereof which lie under the feed plate 41) and may remove the jamming piece of material therefrom through the cleanout opening. In the event the jamming piece of material is lodged under the feed plate 41, the driver may remove the feed plate 41 by removing the cotter pin 51 from the pin 46, pushing the feed plate 41 inwardly and away from the end plate 10 adjacent the discharge opening 18 until the pins 46 and 49 have been withdrawn from the holes 47 and 48, respectively, and lifting the feed plate 41 up and out of the hopper body 7. Access thereby is afforded to the portions of the hopper body 7 and the auger 19 below the feed plate 41.

When the spreading operation has been completed and the driver similarly has moved the cover plate 20 from its backing position to its covering position, the driver quickly and effortlessly may dump any material remaining in the hopper body 7 by tilting the dump box 2 (and, therefore, the hopper body 7) so that the outer edge of the bottom 9 of the hopper body 7 is lower than the inner or front edge of the bottom 9. The remaining material then will flow through the cleanout opening and over the outer edge of the hopper bottom 9 and out of the hopper body 7. The hopper body 7 therefore is virtually self-cleaning; and the driver need not perform the additional, manual task of hydraulically flushing the remaining material out of the hopper body 7, which is required for U-shaped hopper bodies wherein the outer or rear wall is fixed.

Various modes for carrying out the invention are contemplated as being within the scope of the following claims particularly pointing out and distinctly claiming the subject matter which is regarded as the invention.

I claim:
1. In spreader apparatus for mounting below the material discharge opening of a vehicle-mounted dump box,
   a hopper body comprising an inner wall, end walls and a bottom wall, with the bottom wall having a discharge opening for the discharge of material from the hopper body for spreading,
   a cover plate movable between a covering position, in which the cover plate extends across the top of the hopper body to cover the same and permit material in the dump box to be discharged from the material discharge opening of the dump box over the top of the hopper body without passing through the hopper body, and a backing position, in which the cover plate extends upwardly from and is in substantially material-tight communication with the bottom wall of the hopper body to provide an outer wall for the hopper body and to guide material from the material discharge opening of the dump box through the open top of the hopper body and into the hopper body for spreading, and
   means for supporting the cover plate in the covering and backing positions and for effecting substantially material-tight communication between the bottom wall of the hopper body and the cover plate in the backing position.

2. A hopper, for spreader apparatus for a vehicle having a dump box mounted on the vehicle for tilting movement, with an opening in the dump box for discharge of material therefrom, comprising
   a hopper body adapted for mounting on the vehicle below the opening in the dump box and having an inner wall, end walls and a bottom wall, with the bottom wall having an outer edge and a discharge opening in the bottom wall intermediate the end walls for the discharge of material from the hopper body for spreading,
   a cover plate having an inner edge and an underside and extending across the top of the hopper body in a covering position to cover the hopper body and permit material in the dump box to be discharged from the opening in the dump box over the top of the hopper body without passing through the hopper body, the cover plate being movable from the covering position through intermediate cleanout positions to a backing position extending upwardly from and in substantially material-tight communication with the bottom wall of the hopper body to form an outer wall for the hopper body and to guide material from the dump box through the open top of the hopper body and into the hopper body, and the cover plate, when in the covering position and the cleanout positions, providing a cleanout opening extending the length of the hopper body above the outer edge of the bottom wall thereof for the removal of residual and jamming materials from the hopper body, and
   support means for supporting the cover plate in the covering and backing positions and for effecting substantially material-tight communication between the bottom wall of the hopper body and the cover plate in the backing position.

3. A hopper as described in claim 2, in which the support means for supporting the cover plate in the covering position is a support arm mounted on the underside of the cover plate and adapted to engage the bottom wall of the hopper body when the cover plate is in the covering position.

4. A hopper as described in claim 2 in which the outer edge of the bottom wall of the hopper body defines a downwardly extending flange and the support means for supporting the cover plate in the backing position and for effecting substantially material-tight communication between the bottom wall of the hopper body and the cover plate in the backing position define longitudinally spaced lugs mounted on the bottom wall to receive the inner edge of the cover plate and urge the cover plate into substantially material-tight communication with the flange when the cover plate is moved to the backing position.

5. The apparatus in claim 4 and a longitudinal seal strip mounted on the cover plate adjacent the inner edge thereof and adapted to overlie the bottom wall of the hopper body adjacent the flange when the cover plate is in backing position to form a substantially material-tight seal between the bottom wall and the cover plate in the backing position.

6. The apparatus of claim 2, with the hopper body having material moving means mounted on the hopper body for moving material lengthwise of the hopper body toward the discharge opening.

7. The apparatus of claim 6 in which the material moving means is an auger mounted in the hopper body for rotation in a right-hand direction.

8. The apparatus in claim 6, with the discharge opening having an outer edge, and a curved feed plate removably mounted on the hopper body above the discharge opening in close surrounding relation to the end of the material moving means adjacent the discharge opening, and extending from the inner wall to the bottom wall of the hopper body adjacent the outer edge of the discharge opening.

9. The apparatus in claim 7, with the discharge opening having an outer edge, and a curved feed plate removably mounted on the hopper body above the discharge opening in close surrounding relation to the auger and having a length slightly greater than the length of the discharge opening and extending from the inner wall to the bottom wall of the hopper body adjacent the outer edge of the discharge opening.

References Cited

UNITED STATES PATENTS

| 85,383 | 12/1868 | House | 222—412 X |
| 2,141,691 | 12/1938 | Kirby | 222—412 X |
| 2,661,125 | 12/1953 | Grandrud | 222—410 X |
| 2,906,436 | 9/1959 | Oehler et al. | 222—164 |
| 3,072,290 | 1/1963 | De Biasi | 222—412 X |
| 3,105,586 | 10/1963 | Carew et al. | 222—412 X |
| 3,180,525 | 4/1965 | Fabian et al. | 222—48 |

WALTER SOBIN, *Primary Examiner.*